US012320206B2

(12) United States Patent
Oku et al.

(10) Patent No.: US 12,320,206 B2
(45) Date of Patent: Jun. 3, 2025

(54) THREADED CONNECTION FOR PIPE

(71) Applicants: NIPPON STEEL CORPORATION, Tokyo (JP); VALLOUREC OIL AND GAS FRANCE, Aulnoye-Aymeries (FR)

(72) Inventors: Yousuke Oku, Tokyo (JP); Satoshi Maruta, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 72 days.

(21) Appl. No.: 17/754,535

(22) PCT Filed: Dec. 22, 2020

(86) PCT No.: PCT/JP2020/047835
§ 371 (c)(1),
(2) Date: Apr. 5, 2022

(87) PCT Pub. No.: WO2021/145161
PCT Pub. Date: Jul. 22, 2021

(65) Prior Publication Data
US 2023/0313620 A1 Oct. 5, 2023

(30) Foreign Application Priority Data
Jan. 17, 2020 (JP) .................. 2020-005810

(51) Int. Cl.
*E21B 17/042* (2006.01)
*F16L 15/00* (2006.01)
*F16L 15/04* (2006.01)

(52) U.S. Cl.
CPC ........ *E21B 17/0423* (2013.01); *F16L 15/002* (2013.01); *F16L 15/04* (2013.01)

(58) Field of Classification Search
CPC ....... F16L 15/002; F16L 15/04; F16L 15/007; E21B 17/0423; E21B 17/042
(Continued)

(56) References Cited

U.S. PATENT DOCUMENTS 4,696,498 A * 9/1987 Church ................. F16L 15/002
285/334
4,830,411 A * 5/1989 Tsuru ..................... E21B 17/042
(Continued)

FOREIGN PATENT DOCUMENTS

| EP | 1631762 A1 | 3/2006 |
| JP | 10169855 A | 6/1998 |

(Continued)

OTHER PUBLICATIONS

WO2018211873A1—Machine Translation—English (Year: 2018).*

*Primary Examiner* — William S. Choi
(74) *Attorney, Agent, or Firm* — GREER BURNS & CRAIN, LTD.

(57) ABSTRACT

In a threaded connection for pipe having a two-step thread construction with intermediate shoulder surfaces, compression resistance is further improved. Upon completion of make-up of the pin 2 and box 3, the diameter of a stabbing clearance is 0.15 mm or smaller, where the stabbing clearance is defined between the stab flank of a male thread including an inner thread portion 27 and an outer thread portion 23 and the stab flank of a female thread including an inner thread portion 36 and an outer thread portion 32, thereby causing the stab flanks of the male and female threads to start to be in contact before the angle of rotation θ of the intermediate shoulder surfaces 25 and 34 as appearing in a longitudinal cross section starts to rapidly increase, thus preventing accumulation of damage in the intermediate shoulder surfaces 25 and 34.

8 Claims, 13 Drawing Sheets

(58) Field of Classification Search
USPC .................................................. 285/333, 334
See application file for complete search history.

(56) References Cited

U.S. PATENT DOCUMENTS

| | | | |
|---|---|---|---|
| 5,348,350 A * | 9/1994 | Blose | .................... E21B 17/042 |
| 5,415,442 A * | 5/1995 | Klementich | ........ E21B 17/0423 |
| 5,419,595 A * | 5/1995 | Yamamoto | ............ E21B 17/042 |
| 6,530,607 B1 | 3/2003 | Mallis et al. | |
| 6,581,980 B1 | 6/2003 | Delange et al. | |
| 10,883,632 B2 * | 1/2021 | Oku | ....................... F16L 15/04 |
| 12,007,045 B2 | 6/2024 | Maruta et al. | |
| 2005/0248153 A1 | 11/2005 | Sugino et al. | |
| 2006/0145480 A1 | 7/2006 | Mallis et al. | |
| 2008/0296894 A1 | 12/2008 | Bailey et al. | |
| 2009/0058085 A1 * | 3/2009 | Breihan | ................ F16L 15/002 |
| 2009/0200798 A1 * | 8/2009 | Hamamoto | ............ E21B 17/042 |
| 2013/0181442 A1 | 7/2013 | Sonobe et al. | |
| 2017/0292638 A1 | 10/2017 | Sugino et al. | |
| 2021/0156204 A1 | 5/2021 | Maruta et al. | |
| 2022/0412486 A1 | 12/2022 | Maruta et al. | |

FOREIGN PATENT DOCUMENTS

| | | | | |
|---|---|---|---|---|
| JP | 2006526747 A | 11/2006 | | |
| JP | 2012149760 A | 8/2012 | | |
| WO | 0111182 A1 | 2/2001 | | |
| WO | 03076837 A2 | 9/2003 | | |
| WO | WO-2010059145 A1 * | 5/2010 | ........... E21B 17/042 | |
| WO | 2016056222 A1 | 4/2016 | | |
| WO | 2018211873 A1 | 11/2018 | | |

* cited by examiner

THREADED CONNECTION FOR PIPE

TECHNICAL FIELD

The present disclosure relates to a threaded connection for pipe used to connect steel pipes, for example.

BACKGROUND ART

To mine underground resources in oil wells, natural-gas wells, etc. (hereinafter collectively referred to as "oil wells"), use is made of casing that forms a multi-run well wall and tubing positioned within the casing to produce oil or gas. Such casing or tubing is composed of a large number of steel pipes connected in series, where a threaded connection for pipe is used to connect them. A steel pipe used in an oil well is also referred to as oil-well pipe.

Threaded connections for pipe are generally categorized as integral type and coupling type. Integral threaded connections for pipe are disclosed, for example, in Patent Documents 1 and 2 listed below, and a coupling-type threaded connection for pipe is disclosed in, for example, Patent Document 3 listed below.

An integral connection directly connects oil-well pipes. Specifically, a female thread is provided on one end of each oil-well pipe, while a male thread is provided on the other end of each pipe; into the female thread of one oil-well pipe is screwed the male thread of another oil-well pipe such that the oil-well pipes are connected.

In the case of a coupling-type connection, oil-well pipes are connected using a tubular coupling. Specifically, a female thread is provided on each end of the coupling, while a male thread is provided on each end of each oil-well pipe. Then, one male thread of one oil-well pipe is screwed into one female thread of the coupling and one male thread of another oil-well pipe is screwed into the other female thread of the coupling such that the oil-well pipes are connected by means of the coupling. That is, a coupling-type connection directly connects a pair of pipes, one of which is an oil-well pipe while the other one is a coupling.

Generally, an end of an oil-well pipe on which a male thread is provided includes an element to be inserted into a female thread provided on an oil-well pipe or coupling, and thus is referred to as pin. An end of an oil-well pipe or coupling on which a female thread is provided includes an element for receiving a male thread provided on an end of an oil-well pipe, and thus is referred to as box.

In recent years, deeper and deeper wells with higher temperatures and higher pressures have been developed. A deep well has a complicated formation-pressure distribution with depth, which requires an increased number of casing runs; thus, a type of threaded connection is sometimes used which has a maximum outer diameter, i.e., a box outer diameter, that is substantially equal to the outer diameter of the pipe body of the oil-well pipe. A threaded connection with a box outer diameter that is substantially equal to the outer diameter of the pipe body of the oil-well pipe is sometimes referred to as flush-type threaded connection. Further, a threaded connection with a box outer diameter smaller than about 108% of the outer diameter of the pipe body of the oil-well pipe is sometimes referred to as semi-flush-type threaded connection. Such a flush-type or semi-flush-type threaded connection is not only required to have high strength and sealability, but is under strict size restrictions for its various locations in order to allow thread structures and seal structures to be positioned within a limited pipe-wall thickness.

For flush-type and semi-flush-type threaded connections with tight size restrictions, a connection design is often employed that includes intermediate shoulder surfaces in the middle of the connection as determined along the axial direction, with male and female threads positioned forward and rearward thereof, i.e., two thread steps.

Patent Document 1 discloses a threaded connection with such a two-step thread construction that ensures stable sealability. The technique of Patent Document 1 attempts to ensure stable sealability even after application of repeated loading by providing an inner groove between the inner sealing surface and inner female thread portion of the box that can accommodate part of the inner male thread portion of the pin.

Patent Document 2 discloses a flush-type/semi-flush-type threaded connection that includes an annular portion located between the outer sealing surface and female thread of the box and having a length in the pipe-axis direction that is larger than the thread pitch of the female thread, thereby ensuring that the outer seal provides sufficient sealability.

PRIOR ART DOCUMENTS

Patent Documents

[Patent Document 1] WO 2018/211873
[Patent Document 2] WO 2016/056222
[Patent Document 3] JP 2012-149760 A

SUMMARY OF THE INVENTION

Problems to be Solved by the Invention

To maintain the sealability provided by the interference between the sealing surfaces, it is effective to improve the compression resistance of the threaded connection because, if portions of the threaded connection are deformed by compressive loads and the sealing surfaces shift in axial position, an inappropriate amount of interference between the sealing surfaces results, adversely affecting sealability.

However, an integral, flush-type/semi-flush-type threaded connection with a two-step threaded construction is under wall-thickness restrictions that make it difficult to provide a large contact width for the intermediate shoulder surfaces (i.e., radial width of the contact portions). If the contact width of the intermediate shoulder surfaces is increased, the pipe-wall thicknesses at the threads and seals of the pin and box are sacrificed, leading to decreased performance such as sealability, while making it difficult to provide sufficient areas of the intermediate critical cross sections of the pin and box, leading to decreased tensile strength and sealability of the threaded connection.

Meanwhile, as deeper oil wells with higher temperatures and higher pressures have been developed in recent years, further improvements in compression resistance are desired; the technique disclosed in Patent Document 1 which lets only the intermediate shoulder surfaces bear compressive loads alone does not provide a sufficient compression resistance.

Patent Document 3 listed above discloses a threaded connection for pipe having a pin that includes a nose extending from the male thread portion in the direction of the pipe end and a shoulder surface on the end of the nose, where the thread clearance G between the stab flanks of the male and female threads is within a range of 0.01 to 0.1 mm such that, upon application of an axial compressive load, the stab flanks of the male and female threads contact each other to bear part of the axial compressive load, thereby improving compression resistance.

However, Patent Document 3 relates to threaded connections of a different type from threaded connections with a two-step thread construction, and does not disclose how large the clearance between the stab flanks should be in order to prevent undesirable deformation of the intermediate shoulder surfaces of a threaded connection with a two-step thread construction.

An object of the present disclosure is to further improve the compression resistance of a threaded connection for pipe with a two-step thread construction.

Means for Solving the Problems

The inventors of the present application focused on how the intermediate shoulder surfaces of a threaded connection for pipe with a two-step thread construction deform upon application of a compressive load and to what extent, and analyzed these factors using elasto-plastic analysis, mainly using computer simulations. They found that the larger the axial compressive load applied to the intermediate shoulder surfaces of the pin and box, the larger the angle of shoulder rotation θ becomes. Further, they discovered that, if only the intermediate shoulder surfaces are to bear axial compressive loads, for axial compressive loads larger than a certain level, the unit increment Δθ of the angle of shoulder rotation of the intermediate shoulder surfaces per unit increment ΔL of axial compressive loading rapidly increases, as shown in FIG. 1.

As used herein, angle of shoulder rotation θ is defined, as shown in FIG. 2, as the angle formed between a straight line L1 passing through the outer edge P1 of the intermediate shoulder surface of the pin and the inner edge B1 of the intermediate shoulder surface of the box as appearing in a longitudinal cross section upon completion of make-up, on one hand, and a straight line L2 passing through the outer edge P2 of the intermediate shoulder surface of the pin and the inner edge B2 of the intermediate shoulder surface of the box as appearing in the same longitudinal cross section upon application of the axial compressive load. In FIG. 2, the intermediate shoulder surfaces upon completion of make-up are indicated by phantom lines, while the intermediate shoulder surfaces upon application of an axial compressive load are indicated by solid lines. Although FIG. 2 shows a point for B2 superimposed on the point for B1, in reality, B1 and B2 are not necessarily positioned in such a way that their points are superimposed. Here, the outer edge of the intermediate shoulder surface of the pin is the outer end of the contact surface in contact with the intermediate shoulder surface of the box, not the outer end of a chamfer provided at the outer peripheral edge of the intermediate shoulder surface of the pin. The inner edge of the intermediate shoulder surface of the box is the inner end of the contact surface in contact with the intermediate shoulder surface of the pin, not the inner end of a chamfer provided at the inner peripheral edge of the intermediate shoulder surface of the box.

Further, as used herein, "upon completion of make-up" means a point of time where, after the pin has been made up on the box, neither an axial load nor an inner/outer pressure is applied to the threaded connection. On the other hand, "when the connection is made up" means that the pin and box are made up, regardless of whether at least one of an axial load, inner pressure and outer pressure is being applied, that is, "when the connection is made up" applies if the pin and box are made up, even after application of an axial load, inner pressure and outer pressure within a range that does not result in a fracture of the threaded connection nor a loss of the contact surface pressure between the sealing surfaces of the pin and box, more preferably within the elastic range. In this disclosure, "an axial load, inner pressure and outer pressure within the elastic range" may be an axial load, inner pressure and outer pressure within the yield ellipse to which a threaded connection of interest assures strength.

If the angle of shoulder rotation of the intermediate shoulder surfaces is too large, plastic strain can easily be accumulated in and near the intermediate shoulder surfaces, which is an undesirable situation. Further, a large angle of shoulder rotation may cause such a degree of deformation of the outer edge and nearby portions of the intermediate shoulder surfaces of the pin and the inner edge and nearby portions of the intermediate shoulder surface of the box as to cause a crush, which may decrease the effective shoulder contact area thereafter.

All this suggests that, if the size of the clearance between the stab flanks of the male and female threads upon completion of make-up is such that the stab flanks start to be in contact at a time point X (see FIG. 1) prior to a rapid increase of the unit increment Δθ of the angle of shoulder rotation θ, then, even when a relatively large compressive load is applied, the compressive load acting on the intermediate shoulder surfaces will be smaller and, as indicated by the two-point chain lines in FIG. 1, the amount of increase in the angle of shoulder rotation θ after the stab flanks have contacted each other will be smaller.

Next, the inventors of the present application examined threaded connections of several sets of pipe diameters to determine the angle of shoulder rotation θ at which the unit increment Δθ rapidly increases, and found that, regardless of pipe diameters, the unit increment Δθ of the angle of shoulder rotation rapidly increases for an angle of shoulder rotation θ larger than about 1°.

When an axial compressive load is applied to a two-step threaded connection having intermediate shoulders, compressive strain is produced in the pin and box such that the amount of contraction α of the pin and box as measured in the axial direction increases as it goes away from the intermediate shoulders in the axial direction. As such, in an arrangement where the size of the stabbing clearance is uniform along the entire length, when compressive load is gradually increased, the stab flanks tend to contact each other starting at locations distant from the intermediate shoulders and such contact between the stab flanks then progresses successively toward locations near the intermediate shoulders.

Further, the relative displacement between the stab flanks of the pin and box is affected not only by the above-mentioned amount of contraction α, but also by the amount of shifting β of the pin and box as measured in the axial direction caused by the rotational deformation of the intermediate shoulder surfaces. This amount of shifting β can be expressed by Dsh×tanθ, where Dsh is the distance between the radially outer edge of the intermediate shoulder surface of the pin and the radially inner edge of the intermediate shoulder surface of the box as appearing in a longitudinal cross section upon completion of make-up (i.e., radial width of the area of contact between the intermediate shoulder surfaces) as shown in FIG. 2.

The above-mentioned relative displacement between the portions of the stab flanks of the pin and box that have started to be in contact with each other is equal to the clearance G between the stab flanks upon completion of make-up; as such, the stab flanks start to be in contact even when the angle of shoulder rotation is smaller than 1° if the following expression, (1), is satisfied:

$$G \leq \alpha + \beta = \alpha + Dsh \times \tan 1° \ldots \quad (1),$$

where, when an axial compressive load is applied that causes the stab flanks to start to be in contact, $\alpha$ is the amount of compressive-strain-induced axial displacement of the portions of the stab flanks that have started to be in contact relative to the intermediate shoulders.

The inventors of the present application examined two kinds of specimens with shoulder contact widths Dsh of 1.80 mm and 1.92 mm by conducting elasto-plastic analysis by computer simulation to determine the stabbing clearance G that results in the stab flanks starting to be in contact when the angle of shoulder rotation is 1° or smaller, and found that, for each of these specimens, the stab flanks start to be in contact when the angle of shoulder rotation $\theta$ or smaller is 1° or smaller if the stabbing clearance G is not larger than 0.15 mm. Nevertheless, it is assumed that in the case of a larger shoulder contact width Dsh, the angle of shoulder rotation $\theta$ can be kept to 1° or smaller even with a larger stabbing clearance G.

Substituting G=0.15 and Dsh=1.80 mm or 1.92 mm into Expression (1) and calculating $\alpha$ gives $\alpha$=0.12 mm.

The larger the shoulder contact width Dsh, the larger the axial compressive load that rotates an intermediate shoulder by 1°. Further, usually, the larger the pipe diameter, the larger the shoulder contact width Dsh. Accordingly, it can be assumed that the value of $\alpha$ found when the angle of shoulder rotation is 1° is generally constant regardless of pipe diameters.

The present disclosure is based on these findings.

A threaded connection for pipe according to the present disclosure includes a tubular pin and a tubular box, the pin and the box being adapted to be made up as the pin is screwed into the box. The pin includes a male thread having an inner thread portion and an outer thread portion spaced apart from each other in an axial direction, and an intermediate shoulder surface provided between the inner thread portion and the outer thread portion of the male thread. The box includes a female thread having an inner thread portion adapted to be engaged by the inner thread portion of the male thread when the connection is made up and an outer thread portion adapted to be engaged by the outer thread portion of the male thread when the connection is made up, and an intermediate shoulder surface provided between the inner thread portion and the outer thread portion of the female thread and adapted to be in contact with the intermediate shoulder surface of the pin when the connection is made up. The male thread and the female thread are constructed in such a manner that, upon completion of make-up, load flanks of the male thread and the female thread are in contact with each other and a clearance is formed between stab flanks of the male thread and the female thread. The clearance formed between the stab flanks of the male thread and the female thread upon completion of make-up is of such a size that, when a predetermined axial compressive load smaller than a yield compressive load of the pin and the box is applied, the pin and the box deform in such a manner that the stab flanks of the male thread and the female thread start to be in contact so as to bear part of the axial compressive load.

The threaded connection for pipe according to the present disclosure satisfies the following expression, (1):

$$G \leq 0.12 + Dsh \times \tan 1° \ldots \quad (1),$$

where G is the dimension of the clearance formed between the stab flanks of the male thread and the female thread upon completion of make-up as measured in the pipe-axis direction, and Dsh is the distance between a radially outer edge of the intermediate shoulder surface of the pin and a radially inner edge of the intermediate shoulder surface of the box as appearing in a longitudinal cross section upon completion of make-up.

Effects of the Invention

According to the present disclosure, when a threaded connection with a two-step thread construction receives gradually increasing axial compressive loads applied thereto, the stab flanks of the male and female threads contact each other before the unit increment $\Delta\theta$ of the angle of rotation of the intermediate shoulder surfaces increases to a certain level, thus letting the stab flanks bear part of the axial compressive load to achieve a relatively small angle of shoulder rotation $\theta$ for the intermediate shoulder surfaces, i.e., a relatively small amount of rotational deformation of the intermediate shoulder surfaces as appearing in a longitudinal cross section even upon application of a relatively large axial compressive load, thereby reducing damage accumulated in the intermediate shoulder surfaces. This will achieve the desired further improvements in the compression resistance of a threaded connection with a two-stage thread construction.

EMBODIMENTS FOR CARRYING OUT THE INVENTION

Figure 1:
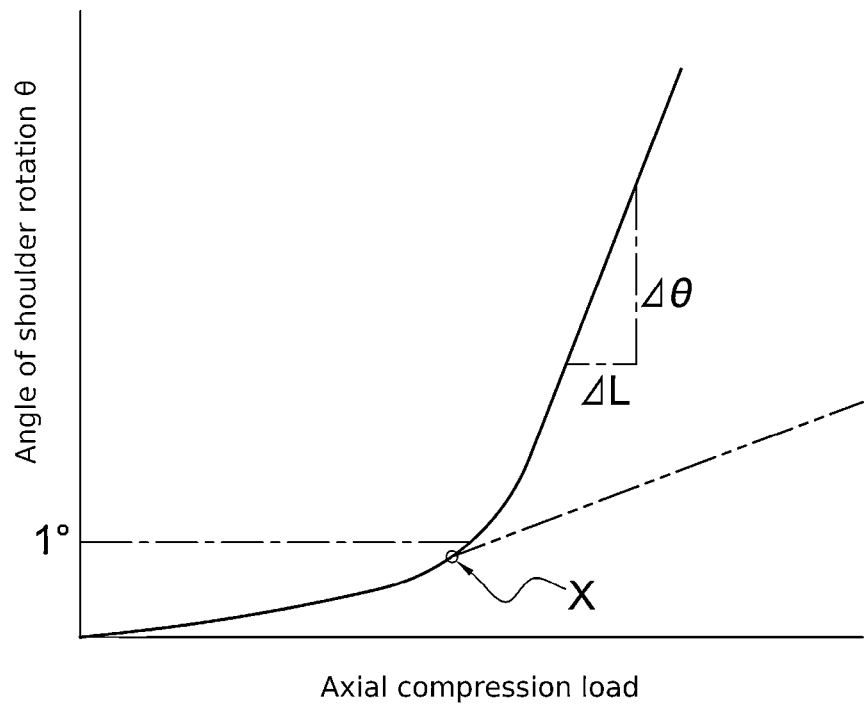
FIG. 1 is a graph showing the relationship between axial compressive load and the angle of shoulder rotation in a threaded connection for pipe with a two-step thread construction where only the intermediate shoulder surfaces bear axial compressive loads.
Figure 2:
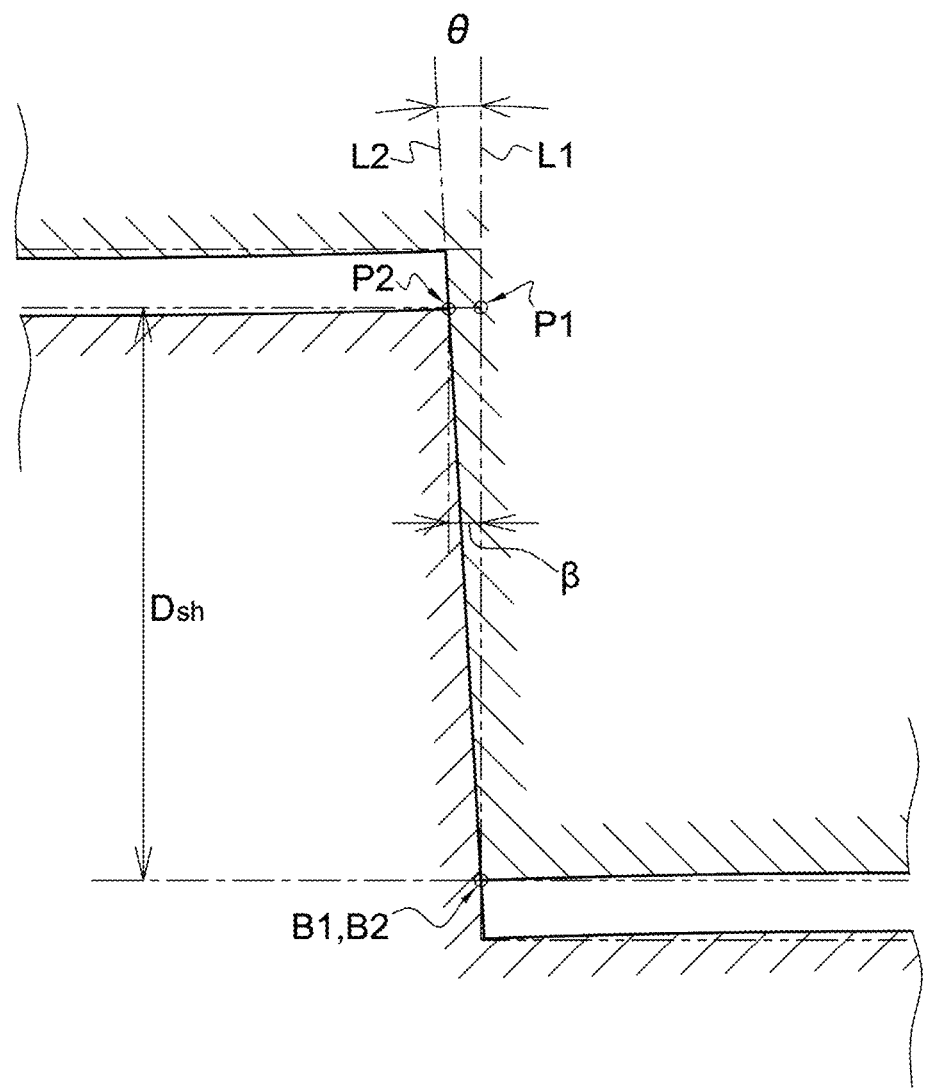
FIG. 2 is a simplified enlarged cross-sectional view of the intermediate shoulder surfaces of a threaded connection for pipe with a two-step thread construction as deformed, upon application of an axial compressive load to the connection.

A threaded connection according to the present embodiment includes a tubular pin and a tubular box. The pin and box are made up as the pin is screwed into the box. A pin is provided at a pipe end of a first pipe and a box is provided at a pipe end of a second pipe. The first pipe may be a long pipe, such as oil-well pipe. The second pipe may be a long pipe, such as oil-well pipe, or a coupling for connecting long pipes. The oil-well pipe and coupling are typically made of steel; alternatively, they may be made of a metal such as stainless steel or nickel-based alloy.

The pin may include a male thread set having an inner thread portion and an outer thread portion spaced apart from each other in the axial direction, and an intermediate shoulder surface provided between the inner thread portion and the outer thread portion of the male thread. Preferably, each of the inner and outer thread portions is constituted by a tapered thread. The inner thread portion may be positioned further toward the pipe end than the outer thread portion is. Preferably, the taper generatrix of the tapered thread constituting the inner thread portion is located radially inward of the taper generatrix of the tapered thread constituting the outer thread portion. The intermediate shoulder surface may be constituted by the side of a stepped portion formed by a portion of the outer periphery of the pin located between the inner and outer thread portions. The intermediate shoulder surface faces toward the pipe end of the pin. Each of the inner and outer thread portions may be a trapezoidal thread, an API round thread, an API buttress thread, or a dovetail thread, for example.

The box may include a female thread set having an inner thread portion and an outer thread portion spaced apart from each other in the axial direction, and an intermediate shoulder surface provided between the inner thread portion and the outer thread portion of the female thread. Preferably, each of the inner and outer thread portions of the female thread is constituted by a tapered thread complementary to the associated one of the inner and outer thread portions of the male thread. The inner thread portion of the female thread is in engagement with the inner thread portion of the male thread when the connection is made up. The outer thread portion of the female thread is in engagement with the outer thread portion of the male thread when the connection is made up. The intermediate shoulder surface of the box may be constituted by the side of a stepped portion formed by a portion of the inner periphery of the box located between the inner and outer thread portions of the female thread. The intermediate shoulder surface of the box faces toward the pipe end of the box and faces the intermediate shoulder surface of the pin. The intermediate shoulder surface of the box is in contact with the intermediate shoulder surface of the pin when the connection is made up, where these intermediate shoulder surfaces function as torque shoulders. Each of the inner and outer thread portions of the female thread may be a trapezoidal thread, an API round thread, an API buttress thread, or a dovetail thread, for example, complementary to the associated one of the inner and outer thread portions of the male thread.

The intermediate shoulder surface of each of the pin and box may be represented by a plane perpendicular to the pipe axis or a tapered plane inclined from such a perpendicular plane as appearing in a longitudinal cross section.

Preferably, a pin inner sealing surface may be provided on the outer periphery of the pin, located further toward the pipe end of the first pipe than the inner thread portion of the pin is, and a box inner sealing surface may be provided on the inner periphery of the box, located further toward the pipe center of the second pipe than the inner thread portion of the box is and adapted to interfere with the pin inner sealing surface when the connection is made up. Preferably, a pin outer sealing surface may be provided on the outer periphery of the pin, located further toward the pipe center of the first pipe than the outer thread portion of the pin is, and a box outer sealing surface may be provided on the inner periphery of the box, located further toward the pipe end of the second pipe than the outer thread portion of the box is and adapted to interfere with the pin outer sealing surface when the connection is made up. In other implementations, each of the pin and box inner sealing surfaces may be located between the inner thread portion and intermediate shoulder surface. In other implementations, each of the pin and box outer sealing surfaces may be located between the outer thread portion and intermediate shoulder surface. One or more such seals may be provided, at different locations as determined along the pipe-axis direction in the case of more than one seal, depending on the required sealability and connection construction, and no such sealing surface may be provided at all in implementations that do not require a large sealability.

Preferably, upon completion of make-up of the pin and box, the load flanks of the inner thread portion of the male thread and the inner thread portion of the female thread is in contact with each other, the load flanks of the outer thread portion of the male thread and the outer thread portion of the female thread is in contact with each other, a clearance is formed between the stab flanks of the inner thread portion of the male thread and the inner thread portion of the female thread, and a clearance is formed between the stab flanks of the outer thread portion of the male thread and the outer thread portion of the female thread.

Preferably, the size of the clearance formed between the stab flanks of the inner thread portion of the male thread and the inner thread portion of the female thread is uniform along the entire range of engagement between the inner thread portions; alternatively, a larger clearance may be present within a small range. Preferably, the size of the clearance formed between the stab flanks of the outer thread portion of the male thread and the outer thread portion of the female thread is uniform along the entire range of engagement between the outer thread portions: alternatively, a larger clearance may be present within a small range. Preferably, the size of the clearance formed between the stab flanks of the inner thread portion of the male thread and the inner thread portion of the female thread is equal to the size of the clearance formed between the stab flanks of the outer thread portion of the male thread and the outer thread portion of the female thread.

Preferably, the clearance formed between the stab flanks of the inner thread portions of the male thread and the female thread upon completion of make-up is of such a size that, upon application of a predetermined axial compressive load smaller than the yield compressive load of the pin and the box, the pin and the box deform in such a manner that the stab flanks of the inner thread portions of the male thread and the female thread start to be in contact to bear part of the axial compressive load. The stab flanks of the inner thread portions may contact in various manners at the time when they start to be in contact; contact may start at a predetermined location on the inner thread portions as determined along the pipe-axis direction and the area of contact between the stab flanks may gradually spread as the axial compressive load increases, or the entire stab flanks of the inner thread portions may be start to be in contact simultaneously.

Preferably, the clearance formed between the stab flanks of the outer thread portions of the male thread and the female thread upon completion of make-up is of such a size that, upon application of a predetermined axial compressive load smaller than the yield compressive load of the pin and the box, the pin and the box deform in such a manner that the stab flanks of the outer thread portions of the male thread and the female thread start to be in contact to bear part of the axial compressive load. The stab flanks of the outer thread portions may contact in various manners at the time when they start to be in contact; contact may start at a predetermined location on the outer thread portions as determined along the pipe-axis direction and the area of contact between the stab flanks may gradually spread as the axial compressive load increases, or the entire stab flanks of the outer thread portions may start to be in contact simultaneously. The axial compressive load at which the stab flanks of the outer thread portions start to be in contact may be different from the axial compressive load at which the stab flanks of the inner thread portions start to be in contact.

Preferably, the threaded connection for pipe according to the present disclosure satisfies the following expression, (1):

$$G \leq 0.12 + Dsh \times \tan 1° \quad \ldots \quad (1),$$

where G is the dimension of the clearance formed between the stab flanks of the male thread and the female thread upon completion of make-up as measured in the pipe-axis direction, and Dsh is the distance between the radially outer edge of the intermediate shoulder surface of the pin and the radially inner edge of the intermediate shoulder surface of the box as appearing in a longitudinal cross section upon completion of make-up. As used herein, size/dimension of the clearance formed between the stab flanks means the size/dimension of the smallest portion of the clearance formed between the stab flanks. If the size of the clearance formed between the stab flanks of the inner thread portions is different from the size of the clearance formed between the stab flanks of the outer thread portions, the smaller one gives the size/dimension of the "clearance formed between the stab flanks of the male and female threads". The outer peripheral edge of the intermediate shoulder surface of the pin and the inner peripheral edge of the intermediate shoulder surface of the box are preferably a regular circle, and the equation (1) may be satisfied in a state where the pin and the box are properly fastened without being contracted.

Preferably, the axial distance between the location at which the contact between the stab flanks of the inner thread portions starts due to the application of a predetermined axial compressive load, on one hand, and the intermediate shoulder surfaces, on the other hand, denoted by TL1, is 0.8 to 1.2 times, and more preferably 0.9 to 1.1 times, the axial distance TL2 between the location at which the contact between the stab flanks of the outer threads starts due to the application of a predetermined axial compressive load, on one hand, and the intermediate shoulder surfaces, on the other hand. This provides uniformity between the amount of relative displacement of those portions of the stab flanks of the inner thread portions which start to be in contact due to compressive strain (i.e., amount of size contraction of the clearance), on one hand, and the amount of relative displacement of those portions of the stab flanks of the outer thread portions which start to be in contact due to compressive strain, on the other hand. This provides uniformity between the axial compressive load at which the contact between the stab flanks of the inner thread portions starts, on one hand, and the axial compressive load at which the contact between the stab flanks of the outer thread portions starts, on the other hand.

The dimension G of the clearance formed between the stab flanks of the male thread and the female thread upon completion of make-up as measured in the pipe-axis direction may be not larger than 0.15 mm, for example. In such implementations, in an integral threaded connection for pipe with first and second pipes having outer diameters not smaller than 180 mm and smaller than 380 mm, and more preferably not smaller than 240 mm and smaller than 360 mm, the stab flanks of the male and female threads start to be in contact before the angle of shoulder rotation of the intermediate shoulders exceeds 1°.

To prevent galling during make-up, it is preferable that the dimension G of the clearance formed between the stab flanks of the male thread and the female thread upon completion of make-up as measured in the pipe-axis direction be not smaller than 0.06 mm.

Preferably, the pin includes a sealing surface located further toward a pin end than the male thread is (i.e., pin inner sealing surface); the box includes a sealing surface adapted to be in contact with the sealing surface of the pin when the connection is made up (i.e., box inner sealing surface) and an inner groove provided at a position on an inner periphery of the box between the sealing surface and the female thread of the box and extending circumferentially, the inner groove being adapted to accommodate part of the male thread of the pin when the connection is made up; and the inner groove has a groove bottom with an axial width smaller than twice a thread pitch of the inner thread portion of the male thread. In such implementations, as the inner groove provided between the sealing surface and inner thread portion of the box contains part of the male thread of the pin, stable sealability is ensured even after application of repeated loading, as disclosed in Patent Document 1. Further, the bottom portion of the inner groove, in which a box critical cross section exists, has a reduced length, thereby increasing the stiffness of the portion of the box at and near the box critical cross section, thus improving compression resistance.

As discussed above, in a two-step threaded connection having intermediate shoulder surfaces, the intermediate shoulder surfaces of the pin and the box have a characteristic that the angle of shoulder rotation θ increases as the axial compressive load applied increases. Preferably, the angle of shoulder rotation θ at which the stab flanks of the male thread and the female thread start to be in contact to bear part of the axial compressive load is less than 1°. Thus, the stab flanks of the male and female threads start to be in contact before the increment of the angle of shoulder rotation increases to a certain level and the stab flanks work to bear part of the axial compressive load, thereby preventing the angle of shoulder rotation θ from becoming excessively large.

[Construction of Threaded Connection for Oil-Well Pipe]

Figure 3:
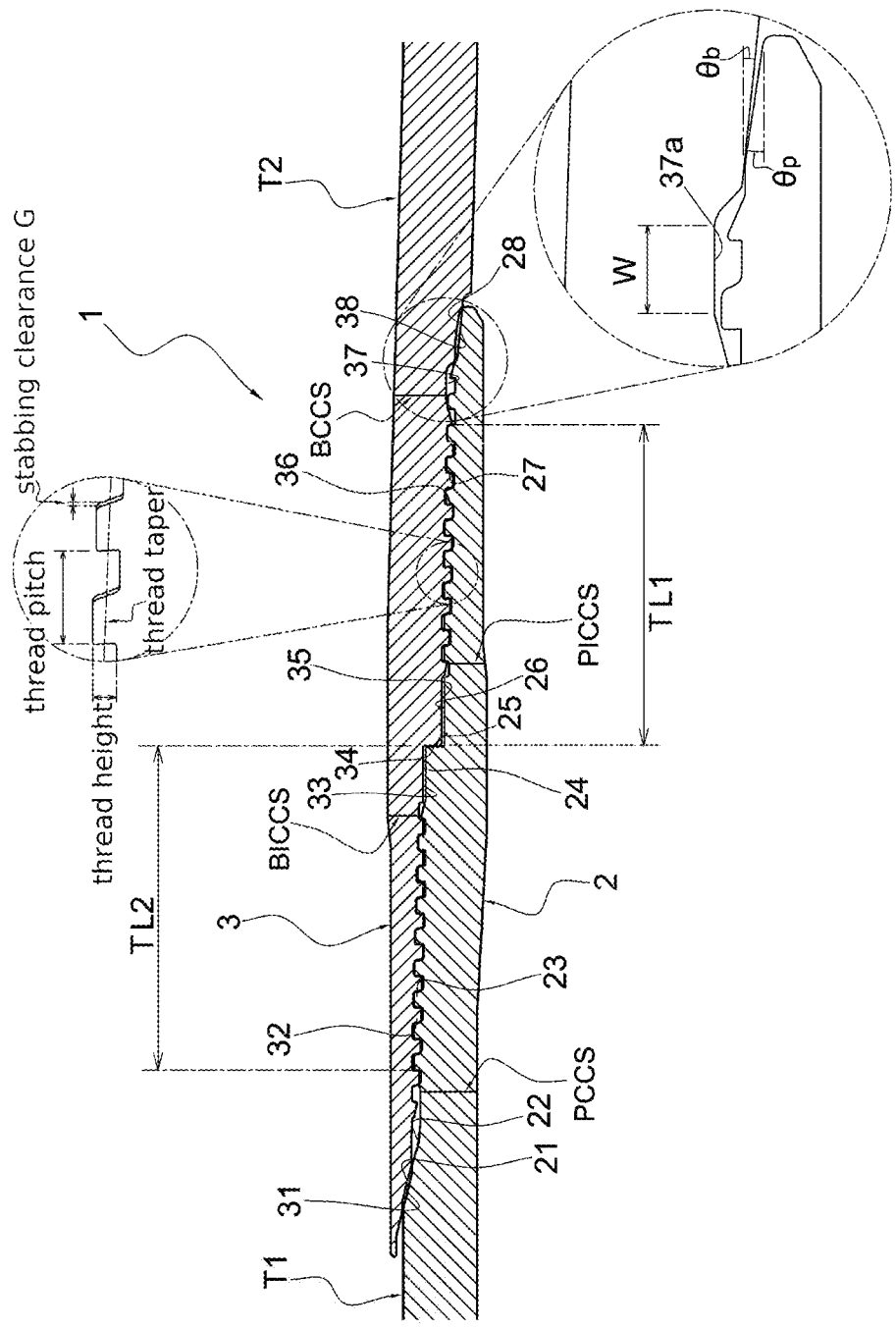
FIG. 3 is a longitudinal cross-sectional view of a threaded connection for oil-well pipe according to an embodiment, as made up.

Referring to FIG. 3, a threaded connection for oil-well pipe according to the present embodiment, denoted by 1, is an integral threaded connection that includes a tubular pin 2 and a tubular box 3 adapted to be made up on the pin 2 when the pin 2 is screwed therein. The pin 2 is provided at a pipe end of one of first and second oil-well pipes T1 and T2 connected together, that one being denoted by T1, and the box 3 is provided at a pipe end of the other oil-well pipe T2. In an arrangement where a pin 2 at a pipe end of a first oil-well pipe T1 is fitted into a box 3 at a pipe end of a second oil-well pipe T2, in order to maximize the pipe-wall thicknesses of the pin 2 and box 3, the pipe end of the oil-well pipe T1, which is to include the pin 2, is swaged while the pipe end of the oil-well pipe T2, which is to include the box 3, is expanded, and each of the pipes is subjected to lathing after the swaging or expansion to produce the pin 2 and box 3.

On the outer periphery of the pin 2 are provided, starting from the pipe center of the first oil-well pipe T1 (i.e., from the left in FIG. 3) toward the pipe end (i.e., toward the right in FIG. 3): a pin outer sealing surface 21, an outer groove 22, an outer thread portion 23 constituted by a tapered thread, a threadless portion 24 having an outer peripheral surface contiguous to the thread root of the outer thread portion 23, a stepped portion including an intermediate shoulder surface 25, a threadless portion 26 including an outer peripheral surface contiguous to the thread crest of an inner thread portion 27, the inner thread portion 27 constituted by a tapered thread having a smaller diameter than the outer thread portion 23, and a pin inner sealing surface 28. The outer and inner thread portions together 23 and 27 constitute a male thread with a two-step thread construction.

On the inner periphery of the box 3 are provided, starting from the pipe end of the second oil-well pipe T2 (i.e., from the left in FIG. 3) toward the pipe center (i.e., toward the right in FIG. 3): a box outer sealing surface 31, an outer thread portion 23 constituted by a tapered thread, a threadless portion 33 having an inner peripheral surface contiguous to the thread crest of the outer thread portion 32, a stepped portion including an intermediate shoulder surface 34, a threadless portion 35 contiguous to the thread root of an inner thread portion 36, the inner thread portion 36 constituted by a tapered thread having a smaller diameter than the outer thread portion 32, an inner groove 37, and a box inner sealing surface 38. The outer and inner thread portions together 32 and 36 constitute a female thread with a two-step thread construction.

As the pin 2 is tightened to the box 3, the intermediate shoulder surface 25 of the pin 2 contacts the intermediate shoulder surface 34 of the box 3. The make-up torque at this moment is sometimes also referred to as shouldering torque. When the pin 2 is further tightened to the box 3, the sliding contact between the intermediate shoulder surfaces 25 and 34 causes a rapid increase in make-up torque. Thus, the intermediate shoulder surfaces 25 and 34 function as torque shoulders. The intermediate shoulder surfaces 25 and 34 or nearby portions and/or male/female threads are fractured when the tightening torque exceeds the respective yield torques, and the tightening torque does not increase anymore even when the amount of tightening rotation is increased. Consequently, the make-up should be completed before the tightening torque reaches a yield torque.

In the threaded connection 1, upon completion of make-up, the stab flanks of the outer thread portion 23 of the male thread and the outer thread portion 32 of the female thread are in contact with each other, and the stab flanks of the inner thread portion 27 of the male thread and the inner thread portion 36 of the female thread are in contact with each other. Further, upon completion of make-up, a small clearance G is formed between the stab flanks of the outer thread portion 23 of the male thread and the outer thread portion 32 of the female thread, and a small clearance G is formed between the stab flanks of the inner thread portion 27 of the male thread and the inner thread portion 36 of the female thread. These clearances G are of such a size that, upon application of a predetermined axial compressive load smaller than the yield compressive load of the pin 2 and box 3, the pin and box elastically deform such that the stab flanks of the outer thread portions 23 and 32 start to be in contact and the stab flanks of the inner thread portions 27 and 36 start to be in contact so as to bear part of the axial compressive load. Yield compressive load means the compressive load at which the yield point is reached. When the yield point is exceeded, plastic strain rapidly progresses in various portions of the pin 2 and box 3 such that the pin and box cannot bear loads exceeding the yield compressive loads anymore, causing the threaded connection 1 to be fractured.

Further, when the connection is made up, the pin outer sealing surface 21 and box outer sealing surface 31 are in interference contact along the entire circumference, thereby providing sealability, mainly against external pressures. When the connection is made up, the pin inner sealing surface 28 and box inner sealing surface 38 are in interference contact along the entire circumference, thereby providing sealability, mainly against internal pressures. It is noted that, during compression, portions of the pin 2 near the inner sealing surface tend to deform radially inwardly to reduce its diameter; if the relationship θp>θb is satisfied, where θp is the taper angle of the pin inner sealing surface 28 constituting a half of the inner seal and θb is the taper angle of the box inner sealing surface 38 constituting the other half, then, the position of contact between the sealing surfaces 28 and 38 is relatively far from the pipe end of the pin, which is expected to mitigate the effects of diameter-reducing deformation and lead to an improvement of sealability upon application of a compressive load.

The outer groove 22 is provided at a location on the outer periphery of the pin between the pin outer sealing surface 21 and outer thread portion 23. The outer groove 22 extends circumferentially, and preferably extends along the entire circumference. The outer groove 22 can accommodate part of the outer thread portion 32 of the female thread of the box 3. Preferably, the outer groove 22 has a groove bottom with an axial width smaller than twice the thread pitch of the outer thread portion 32 of the box 3.

The inner groove 37 is provided at a location on the inner periphery of the box between the box inner sealing surface 38 and inner thread portion 36. The inner groove 37 extends circumferentially, and preferably extends along the entire circumference. The inner groove 37 can accommodate part of the inner thread portion 27 of the male thread of the pin 2. Preferably, the inner groove 37 has a groove bottom 37a with an axial width, W, smaller than twice the thread pitch of the inner thread portion 27 of the pin 2. The threaded connection 1 has a pin critical cross section PCCS located within the range associated with the outer groove 22 and a box critical cross section BSSC within the range associated with the inner groove 37. The box 3 has a box intermediate critical cross section BICCS located near that end of the range of engagement between the outer thread portion 23 of the male thread and the outer thread portion 32 of the female thread which is closer to the intermediate shoulder surface 34. The pin 2 has a pin intermediate critical cross section PICCS located near that end of the range of engagement between the inner thread portion 27 of the male thread and the inner thread portion 36 of the female thread which is closer to the intermediate shoulder surface 25.

Critical cross section (CCS) means a vertical cross section of the connection with the smallest area for bearing a tensile load when the connection is made up. When an excessive axial tensile load is applied, the connection is likely to be fractured at a location at or near a critical cross section. The transmission of a tensile load from the pin and box is axially dispersed along the entire range of thread engagement. Thus, the cross section of the pin on which the entire tensile load acts is located further toward the pipe body of the pin than the range of thread engagement is, while the cross section of the box on which the entire tensile load acts is located further toward the pipe body of the box than the range of thread engagement. That one of the cross sections on which the entire tensile load acts which has the smallest area represents the critical cross section. The ratio of the area of the critical cross section to the cross-sectional area of the pipe body of the oil-well pipe T1 is referred to as joint efficiency, which is a widely used indicator of the tensile strength of a connection portion for oil-well pipe relative to the tensile strength of the pipe body.

In addition to the box critical cross section BCCS and pin critical cross section PCCS, the threaded connection 1 with a two-step thread construction has another location with a small connection cross section for bearing a tensile strength, located in a central portion of the connection as determined along the axial direction. That is, the threaded connection with a two-step thread construction has a section with no thread engagement in a central portion thereof along the axial direction. In this section with no thread engagement, the tensile load borne by the pin and box is axially transmitted without being increased or decreased. Thus, the pin cross section with the smallest area within the section with no thread engagement represents a pin intermediate critical cross section (PICCS), while the box cross section with the smallest area within the section with no thread engagement represents a box intermediate critical cross section (BICCS). To prevent a fracture in the central portion of the connection, it is preferable to maximize the sum of the areas of the pin and box intermediate critical cross sections.

When the connection is made up, the threadless portion 24 of the pin 2 is inserted into the threadless portion 33 of the box 3, while the threadless portion 26 of the pin 2 is inserted into the threadless portion 35 of the box 3. A clearance is formed between the threadless portions 24 and 33 and another between the threadless portions 26 and 35.

Each of the intermediate shoulder surfaces 25 and 34 is constituted by a flat plane that is perpendicular to the pipe axis when the connection is not made up. Alternatively, each of the intermediate shoulder surfaces 25 and 34 may be slightly inclined from a plane perpendicular to the pipe axis when the connection is not made up.

In the threaded connection 1 for oil-well pipe according to the present embodiment, the intermediate shoulder surfaces 25 and 34 and the inner thread portions 27 and 36 of the male and female threads are constructed so as to satisfy the following expression, (1):

$$G \leq 0.12 + Dsh \times \tan 1° \ldots \qquad (1).$$

Here, G is the dimension of the clearance formed between the stab flanks of the inner thread portions 27 and 36 of the male and female threads upon completion of make-up as measured in the pipe-axis direction, and Dsh is the distance between the radially outer edge of the intermediate shoulder surface 25 of the pin 2 and the radially inner edge of the intermediate shoulder surface 34 of the box 3 as appearing in a longitudinal cross section upon completion of make-up. In the present embodiment, the dimension of the clearance formed between the stab flanks of the outer thread portions 23 and 32 of the male and female threads upon completion of make-up as measured in the pipe-axis direction is equal to the dimension of the clearance formed between the stab flanks of the inner thread portions 27 and 36 of the male and female threads upon completion of make-up as measured in the pipe-axis direction. Alternatively, the dimension of the clearance formed between the stab flanks of the outer thread portions 23 and 32 of the male and female threads upon completion of make-up as measured in the pipe-axis direction may be different from the dimension of the clearance formed between the stab flanks of the inner thread portions 27 and 36 of the male and female threads upon completion of make-up as measured in the pipe-axis direction; in such implementations, too, it is preferable that the dimension of the clearance formed between the stab flanks of the outer thread portions 23 and 32 of the male and female threads upon completion of make-up as measured in the pipe-axis direction also satisfy Expression (1) provided above.

If the outer diameter of the oil-well pipe T1 to be connected by the threaded connection 1 is not smaller than 180 mm and smaller than 380 mm, or more preferably not smaller than 240 mm and smaller than 360 mm, then, it is preferable that $G \leq 0.15$ mm be satisfied. Further, to prevent galling during make-up, it is preferable that $G \geq 0.06$ mm be satisfied.

The present disclosure may not only be applied to integral threaded connections, but also to coupling-type connections. Further, each of the threads may be a trapezoidal thread, an API round thread, an API buttress thread, or a wedge thread, for example. Otherwise, the present disclosure is not limited to the above-illustrated embodiment, and various modifications are possible without departing from the spirit of the present disclosure.

EXAMPLES

To verify the effects of the threaded connection 1 for oil-well pipe according to the present embodiment, simulations were conducted using numerical analysis by the elasto-plastic finite element method to evaluate its compression resistance.

<Test Conditions>

The main dimensions of the threaded-connection specimens tested in the analyses are shown in Table 1. In Table 1, Dout indicates the outer diameter of the pipe body of an oil-well pipe T1; Din indicates the inner diameter of the pipe body of the oil-well pipe T1; JE indicates joint efficiency; TL1 indicates the distance, as measured in the pipe-axis direction, between the location at which the contact between the stab flanks of the inner thread portions 27 and 36 starts (in the present embodiment, that end of the stab flank of the inner thread portion 36 of the female thread which is closer to the box pipe body), on one hand, and the intermediate shoulder surfaces 25 and 34, on the other hand; TL2 indicates the distance, as measured in the pipe-axis direction, between the location at which the contact between the stab flanks of the stab flanks of the outer thread portions 23 and 32 starts (in the present embodiment, that end of the stab flank of the outer thread portion 23 of the male thread which is closer to the pin pipe body), on one hand, and the intermediate shoulder surfaces 25 and 34, on the other hand; G indicates the stabbing clearance upon completion of make-up; and W indicates the axial width of the groove bottom of the inner groove 27.

For each test specimen, the following conditions were used in a unified manner: the thread taper angle of the thread portions 23, 27, 32 and 36 was 1.591° (⅛), the thread height (as measured at the load flank) was 1.3 mm, and the thread pitch was 5.08 mm. The material of the oil-well pipes was Q125 (nominal yield stress YS=862 MPa (125 ksi)).

Figure 4:
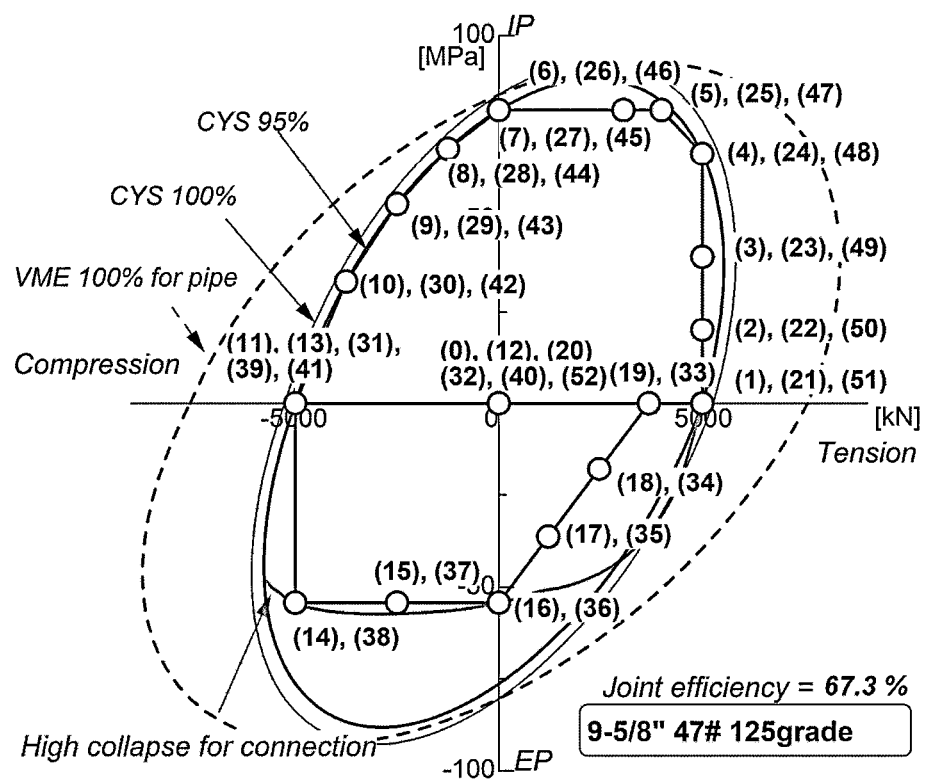
FIG. 4 is a load envelope for complex loading applied to test specimens #1 to #10.
Figure 5:
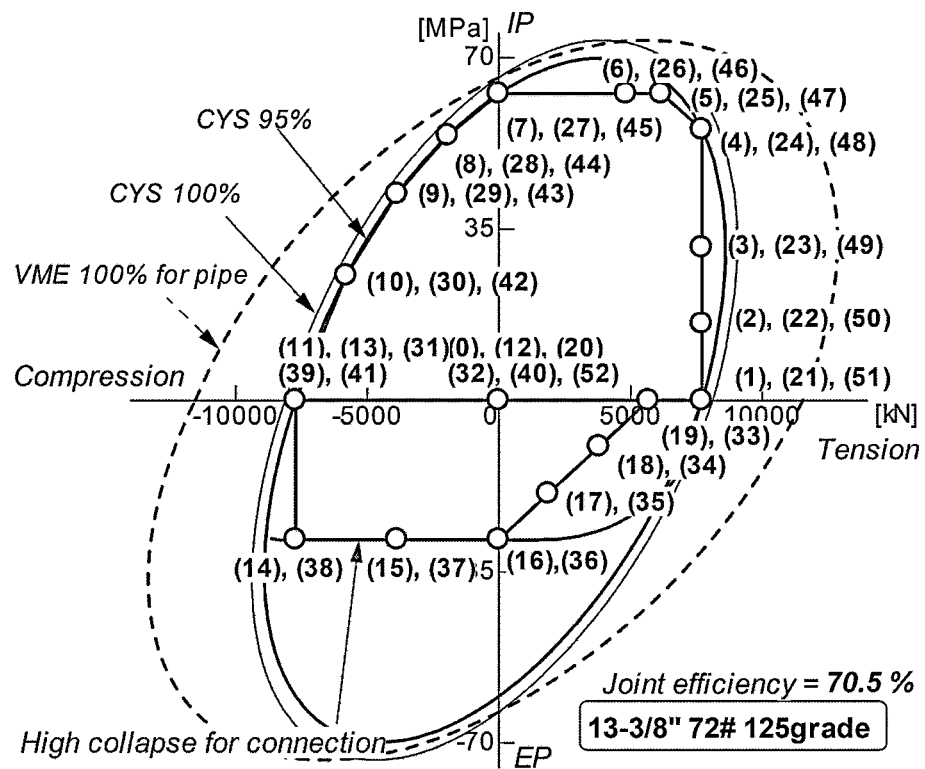
FIG. 5 is a load envelope for complex loading applied to test specimens #11 to #20.
Figure 6:
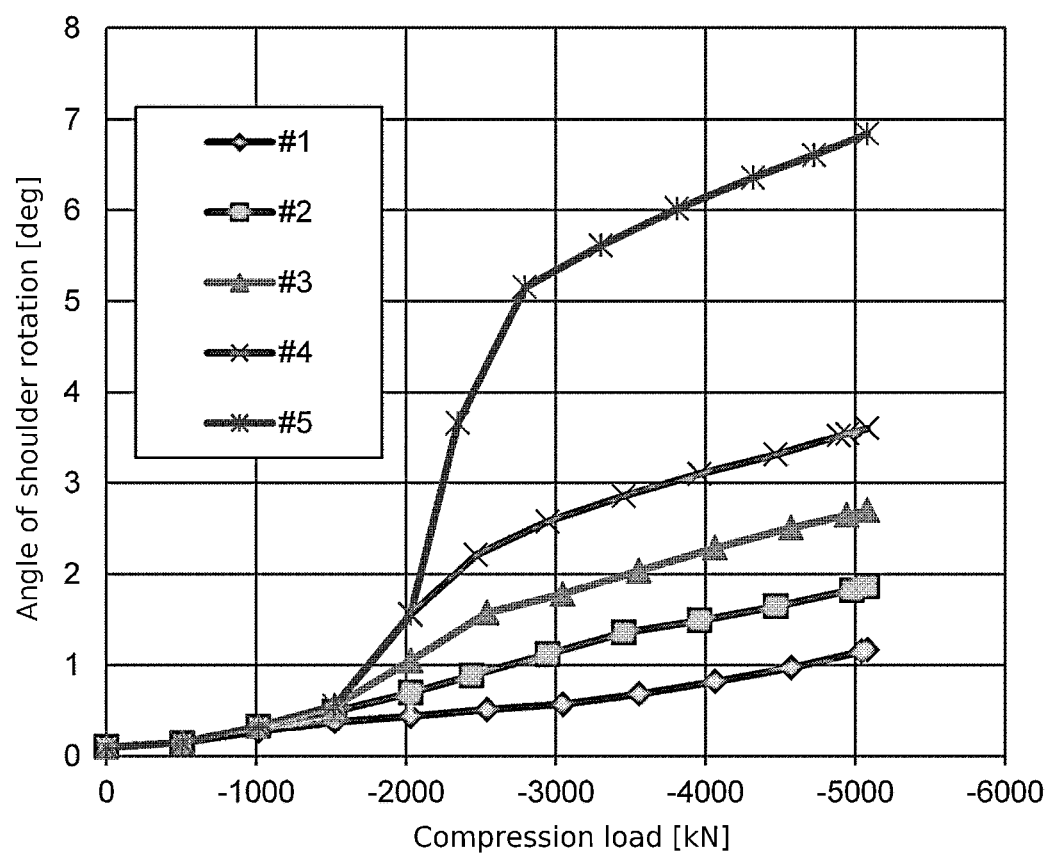
FIG. 6 is a graph showing the relationship between compressive load and the angle of shoulder rotation as found when gradually increased simple compressive loads are applied to test specimens #1 to #5.
Figure 7:
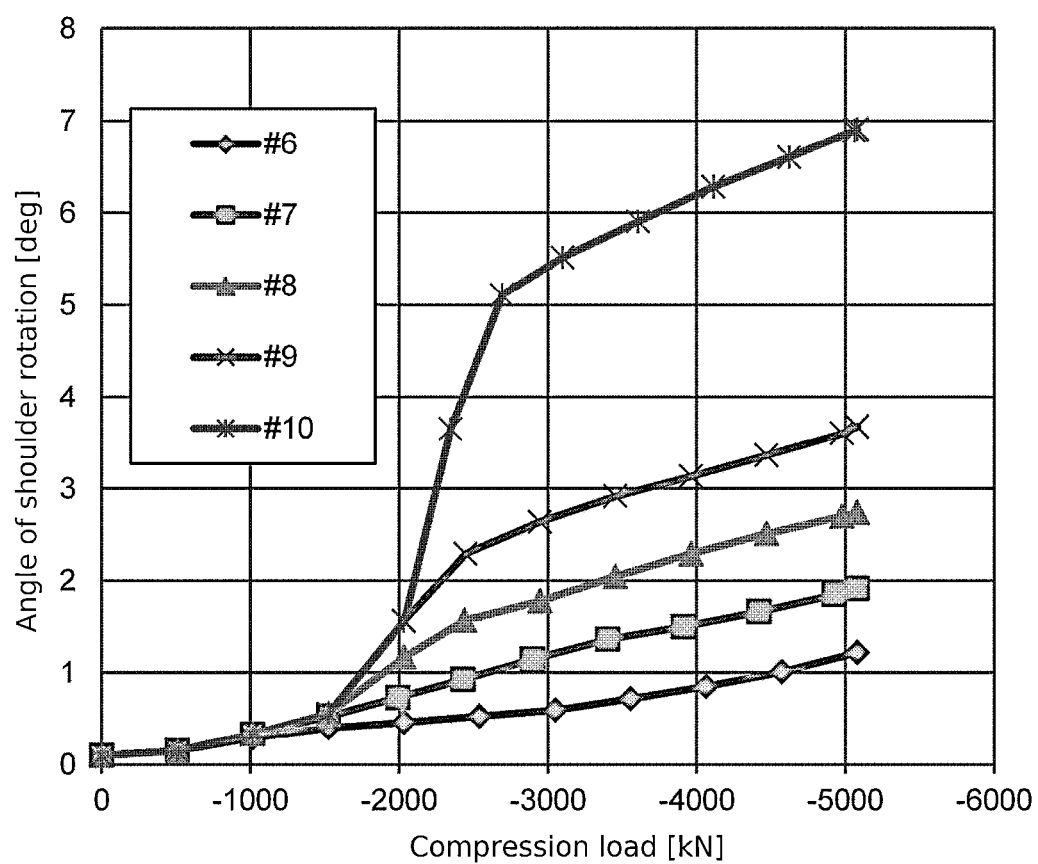
FIG. 7 is a graph showing the relationship between compressive load and the angle of shoulder rotation as found when gradually increased simple compressive loads are applied to test specimens #6 to #10.
Figure 8:
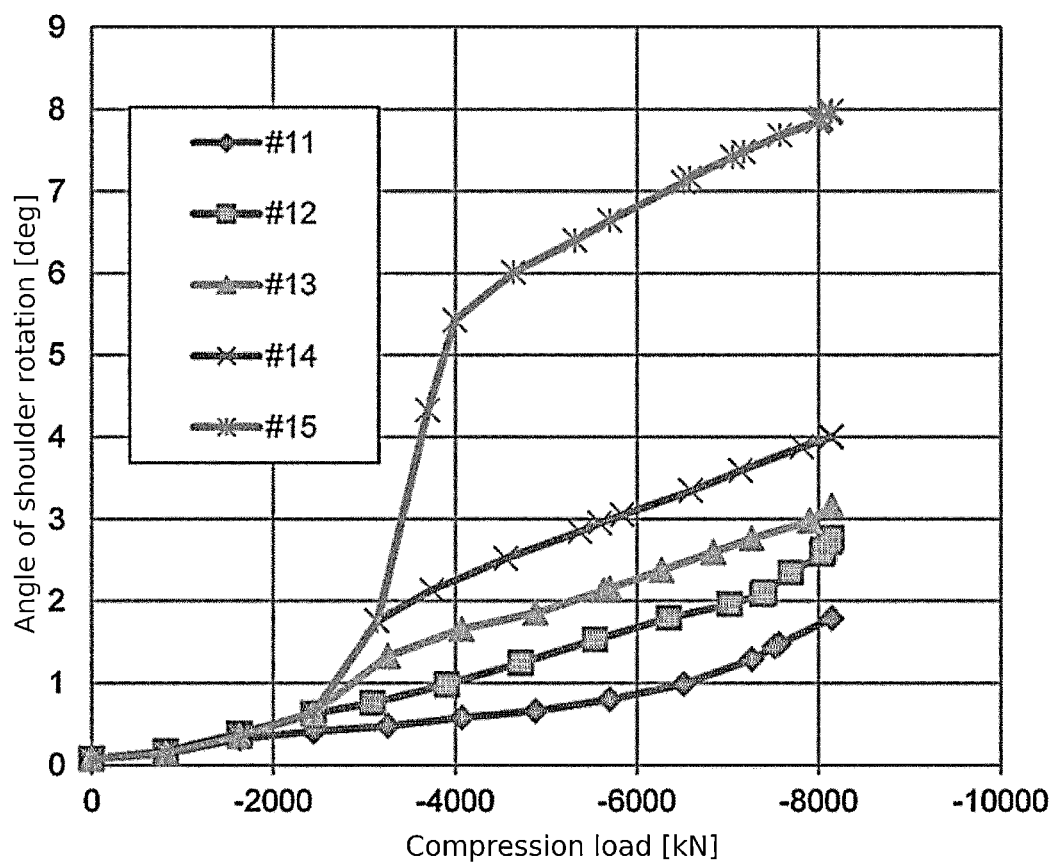
FIG. 8 is a graph showing the relationship between compressive load and the angle of shoulder rotation as found when gradually increased simple compressive loads are applied to test specimens #11 to #15.
Figure 9:
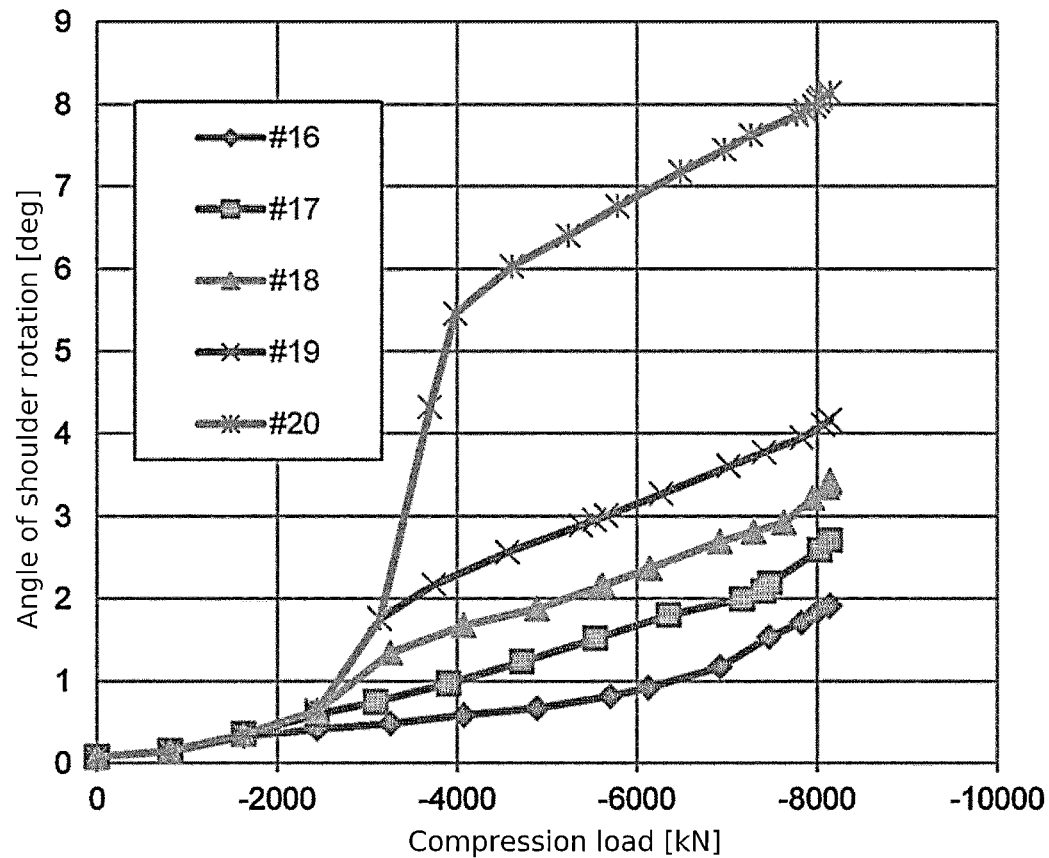
FIG. 9 is a graph showing the relationship between compressive load and the angle of shoulder rotation as found when gradually increased simple compressive loads are applied to test specimens #16 to #20.

With the simulations, analysis was conducted under a loading condition where simple compressive loads were applied and under a loading condition where complex loads were applied that simulated Test Series A in accordance with API 5C5 CAL IV from the year 2017 shown in FIGS. 4 and 5. FIG. 4 is a load envelope for complex loading applied to test specimens #1 to #10 with the pipe size of 9⅝" 47 #(outer diameter of pipe body: 244.48 mm; inner diameter of pipe body: 220.50 mm); and FIG. 5 is a load envelope for complex loading applied to test specimens #11 to #20 of the pipe size of 13⅜" 72 #(outer diameter of pipe body: 339.73 mm; inner diameter of pipe body: 313.61 mm). In the drawings, "Compression" means compressive load; "Tension" means tensile load; "IP" means internal pressure: "EP" means external pressure; "VME 100% for pipe" indicates the yield curve of the pipe body of the oil-well pipe; "Joint efficiency" means joint efficiency; "CYS" (which stands for connection yield strength) means the yield strength of the threaded connection; "CYS 100%" indicates the yield curve of the threaded connection; "CYS 95%" indicates a yield curve for 95% of the 100% CYS; "High collapse for connection" indicates a collapse curve resulting from an external pressure on the threaded connection. The curve for "CYS 100%" was obtained by multiplying the axial force (compression or tension) indicated by "VMA 100% for pipe" by the joint efficiency JE.

To verify compression resistance, the inventors focused on the angle of rotation θ of the intermediate shoulder surfaces 25 and 34, which bear the major part of the compressive load, and determined how this angle of rotation θ changed.

TABLE 1

| Mark | Dout [mm] | Din [mm] | JE [%] | TL1 [mm] | TL2 [mm] | G [mm] | W [mm] | Other |
|---|---|---|---|---|---|---|---|---|
| #1 | 244.48 | 220.50 | 67.3 | 51.7 | 52.4 | 0.060 | 5.37 | inv. ex. |
| #2 | 244.48 | 220.50 | 67.3 | 51.7 | 52.4 | 0.105 | 5.37 | inv. ex. |
| #3 | 244.48 | 220.50 | 67.3 | 51.7 | 52.4 | 0.150 | 5.37 | inv. ex. |
| #4 | 244.48 | 220.50 | 67.3 | 51.7 | 52.4 | 0.200 | 5.37 | comp. ex. |

TABLE 1-continued

| Mark | Dout [mm] | Din [mm] | JE [%] | TL1 [mm] | TL2 [mm] | G [mm] | W [mm] | Other |
|---|---|---|---|---|---|---|---|---|
| #5 | 244.48 | 220.50 | 67.3 | 51.7 | 52.4 | 0.400 | 5.37 | comp. ex. |
| #6 | 244.48 | 220.50 | 67.3 | 51.7 | 52.4 | 0.060 | 10.45 | inv. ex. |
| #7 | 244.48 | 220.50 | 67.3 | 51.7 | 52.4 | 0.105 | 10.45 | inv. ex. |
| #8 | 244.48 | 220.50 | 67.3 | 51.7 | 52.4 | 0.150 | 10.45 | inv. ex. |
| #9 | 244.48 | 220.50 | 67.3 | 51.7 | 52.4 | 0.200 | 10.45 | comp. ex. |
| #10 | 244.48 | 220.50 | 67.3 | 51.7 | 52.4 | 0.400 | 10.45 | comp. ex. |
| #11 | 339.73 | 313.61 | 70.5 | 49.2 | 49.8 | 0.060 | 5.37 | inv. ex. |
| #12 | 339.73 | 313.61 | 70.5 | 49.2 | 49.8 | 0.105 | 5.37 | inv. ex. |
| #13 | 339.73 | 313.61 | 70.5 | 49.2 | 49.8 | 0.150 | 5.37 | inv. ex. |
| #14 | 339.73 | 313.61 | 70.5 | 49.2 | 49.8 | 0.200 | 5.37 | comp. ex. |
| #15 | 339.73 | 313.61 | 70.5 | 49.2 | 49.8 | 0.400 | 5.37 | comp. ex. |
| #16 | 339.73 | 313.61 | 70.5 | 49.2 | 49.8 | 0.060 | 10.45 | inv. ex. |
| #17 | 339.73 | 313.61 | 70.5 | 49.2 | 49.8 | 0.105 | 10.45 | inv. ex. |
| #18 | 339.73 | 313.61 | 70.5 | 49.2 | 49.8 | 0.150 | 10.45 | inv. ex. |
| #19 | 339.73 | 313.61 | 70.5 | 49.2 | 49.8 | 0.200 | 10.45 | comp. ex. |
| #20 | 339.73 | 313.61 | 70.5 | 49.2 | 49.8 | 0.400 | 10.45 | comp. ex. |

<Evaluation Results>

FIGS. 6 to 9 show graphs for comparing angles of shoulder rotation upon application of simple compressive loads for different sizes of the stabbing clearance. A positive value indicates a tensile load, and a negative value indicates a compressive load. The graphs allowed the inventors to determine a tendency that the smaller the stabbing clearance G, the smaller the angle of shoulder rotation, regardless of pipe diameters and dimension of the inner groove.

To describe test specimens #1 to #5 and #6 to #10 in more detail, it was determined that the contact between the stab flanks started at about −2800 KN for test specimens #5 and #10, at about −2000 kN for test specimens #4 and #9, at about −1500 kN for test specimens #3 and #8m, at about −1300 KN for test specimens #2 to #7, and below −1000 kN for test specimens #1 and #6, meaning smaller slopes of curves indicating the angle of shoulder rotation. For test specimens #4, #5, #9 and #10, which had larger stabbing clearances than 0.15 mm, the stab flanks contacted after slope of a curve indicating the angle of shoulder rotation increased to a certain level, which suggests large damage to the intermediate shoulder surfaces.

Figure 10:
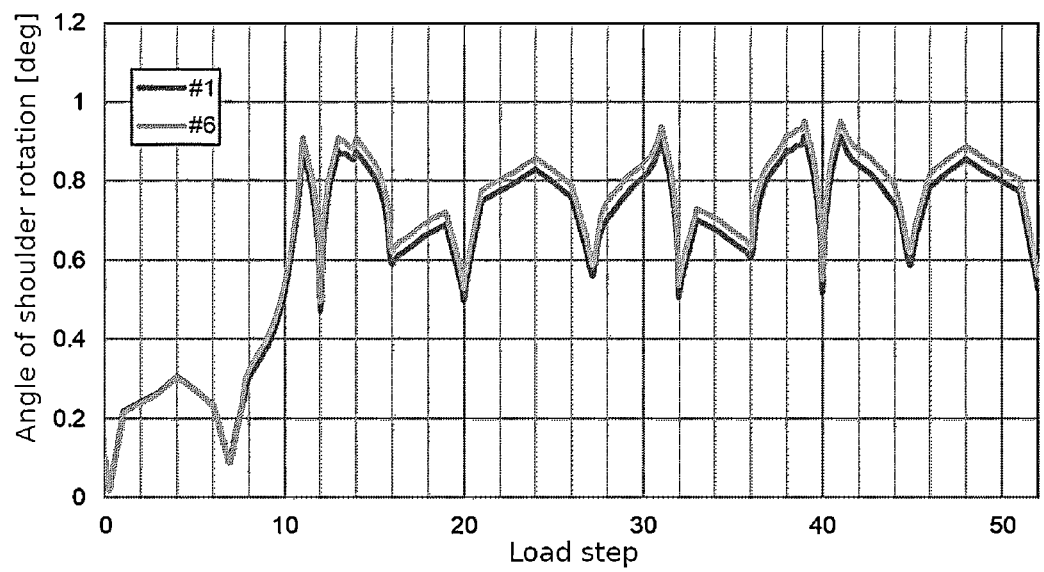
FIG. 10 is a graph showing the angle of shoulder rotation, for various load steps, in two test specimens #1 and #6 with different axial dimensions of the inner groove.
Figure 11:
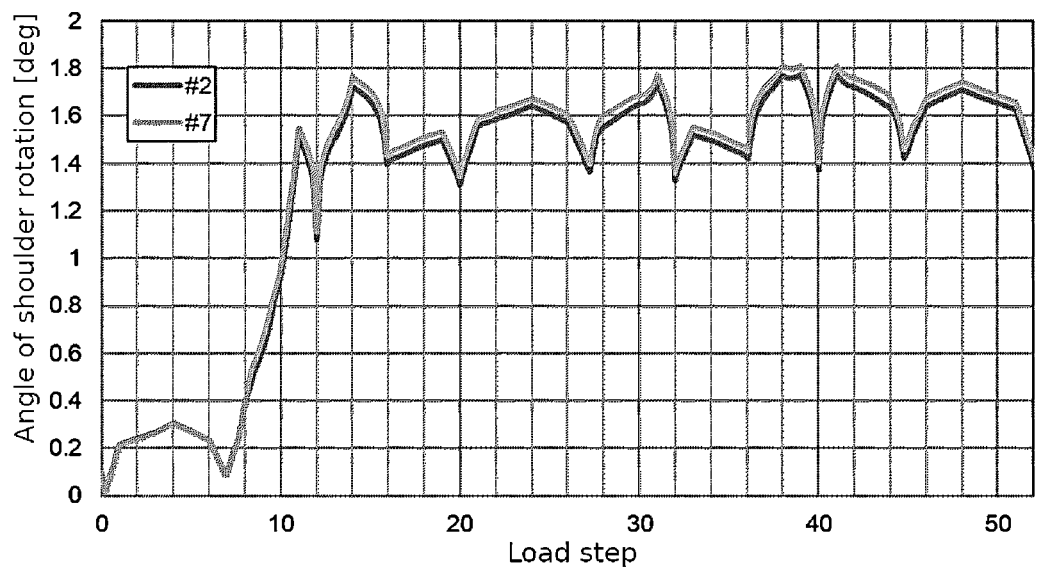
FIG. 11 is a graph showing the angle of shoulder rotation, for various load steps, in two test specimens #2 and #7 with different axial dimensions of the inner groove.
Figure 12:
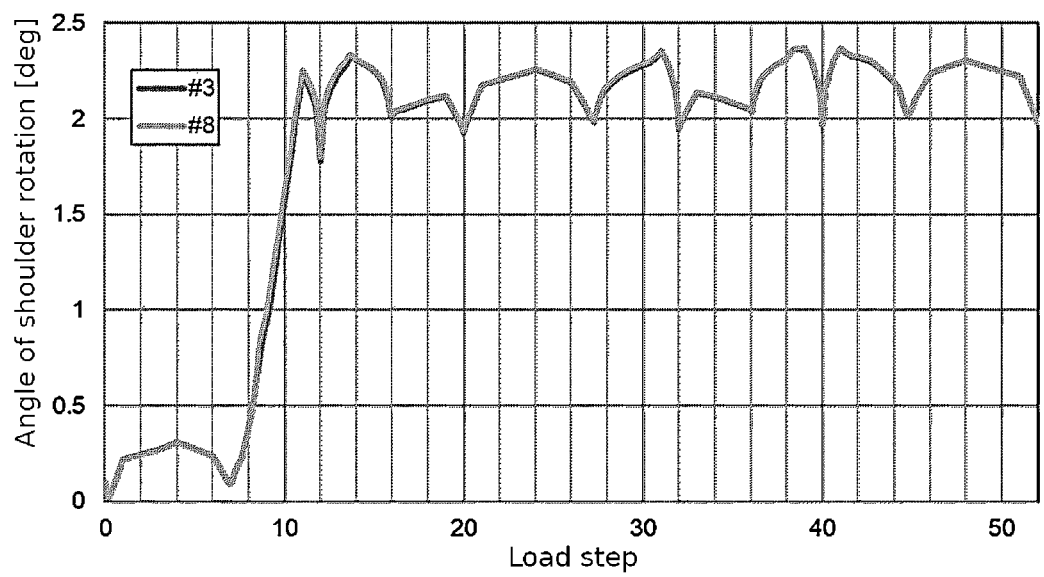
FIG. 12 is a graph showing the angle of shoulder rotation, for various load steps, in two test specimens #3 and #8 with different axial dimensions of the inner groove.

It is clear from the results of the complex loading tests shown in FIGS. 10 to 14 that damage is accumulated in the intermediate shoulder surfaces. The graphs enable determining a tendency that, for each test specimen, damage was accumulated in the intermediate shoulder surfaces at initial load steps where compressive load increased, i.e., steps 7 to 11. However, as shown in FIG. 10, the angle of shoulder rotation was kept below 1° at all the load steps for test specimens #1 and #6, which had smaller stabbing clearances than any other specimens. As shown in FIG. 11, the angle of shoulder rotation was kept between about 1.3° and 1.8° at load steps 11 et seq. for test specimens #2 and #7, which had stabbing clearances smaller than the other test specimens except for #1 and #6. As shown in FIG. 12, generally the same tendency was determined for test specimens #3 and #8, which had a stabbing clearance of 0.15 mm, that is, the angle of shoulder rotation was kept to about 2.3° at load step 11.

Figure 13:
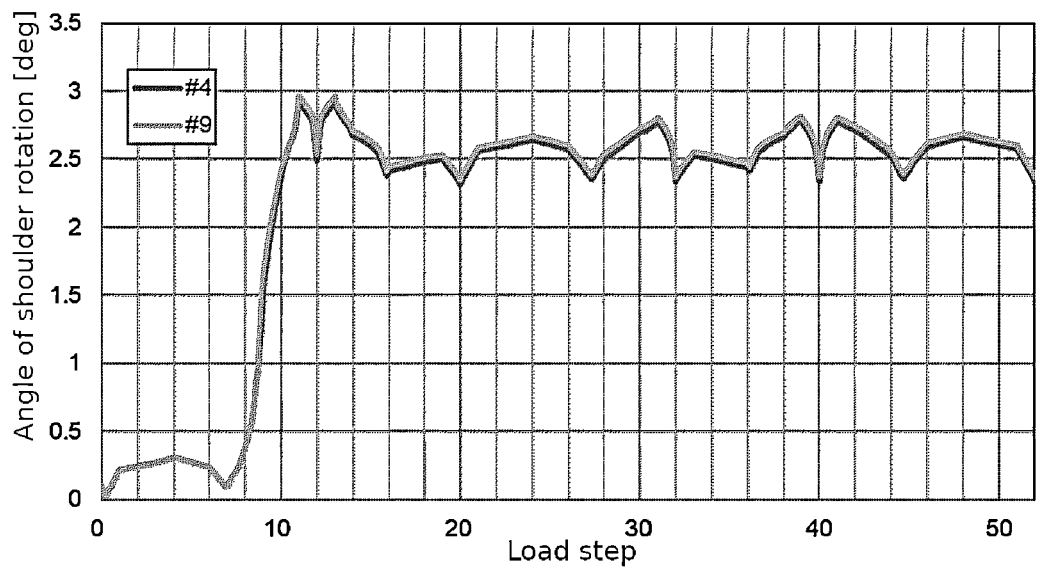
FIG. 13 is a graph showing the angle of shoulder rotation, for various load steps, in two test specimens #4 and #9 with different axial dimensions of the inner groove.
Figure 14:
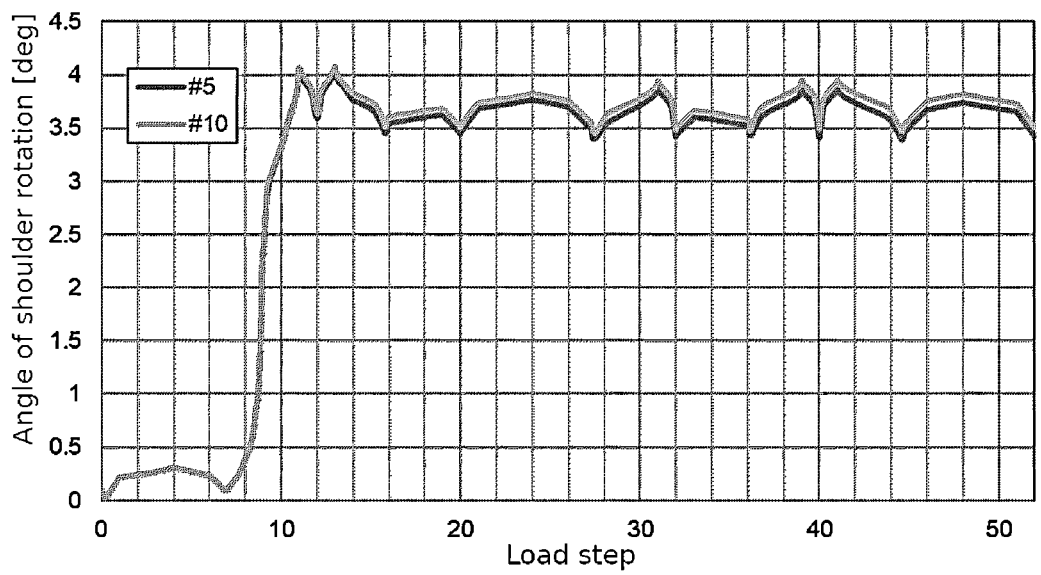
FIG. 14 is a graph showing the angle of shoulder rotation, for various load steps, in two test specimens #5 and #10 with different axial dimensions of the inner groove.
Figure 15:
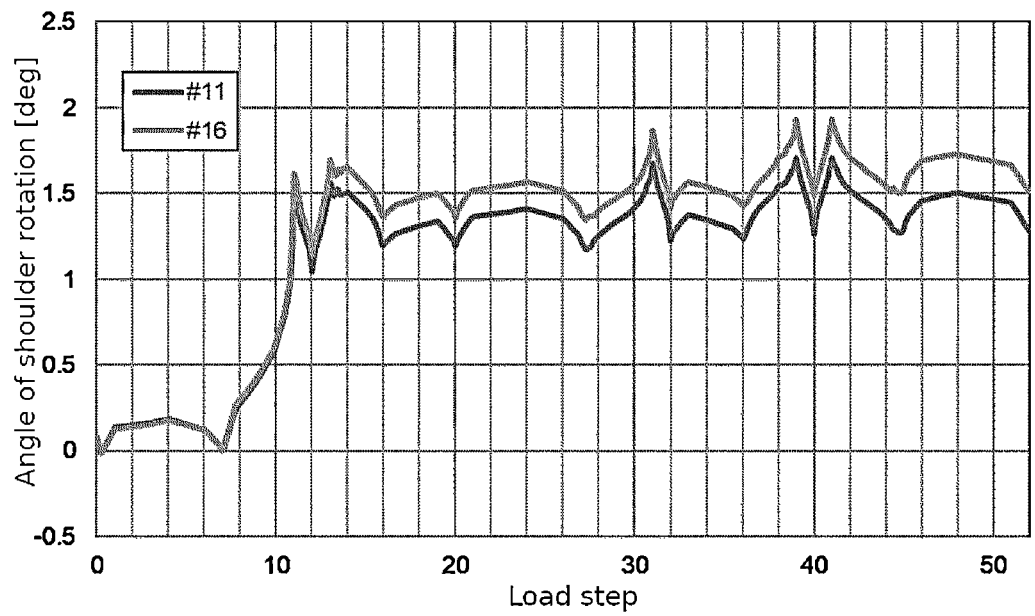
FIG. 15 is a graph showing the angle of shoulder rotation, for various load steps, in two test specimens #11 and #16 with different axial dimensions of the inner groove.
Figure 16:
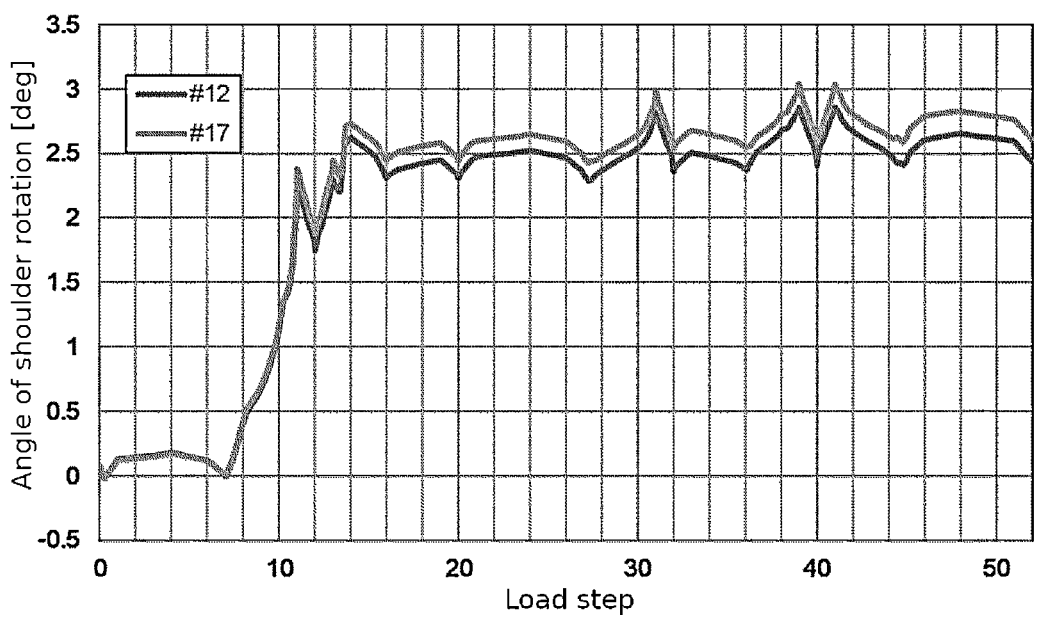
FIG. 16 is a graph showing the angle of shoulder rotation, for various load steps, in two test specimens #12 and #17 with different axial dimensions of the inner groove.
Figure 17:
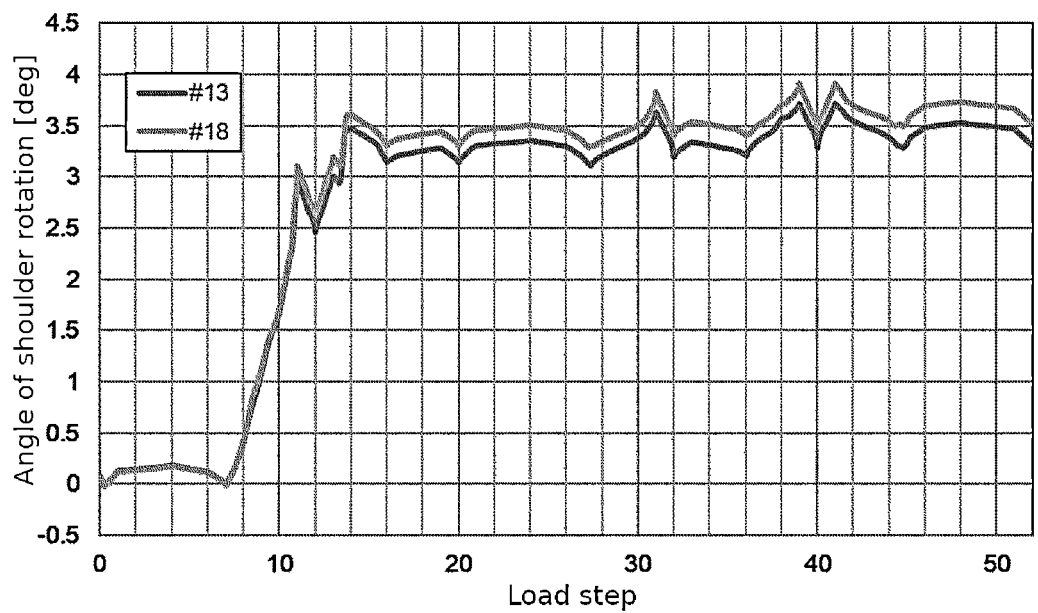
FIG. 17 is a graph showing the angle of shoulder rotation, for various load steps, in two test specimens #13 and #18 with different axial dimensions of the inner groove.
Figure 18:
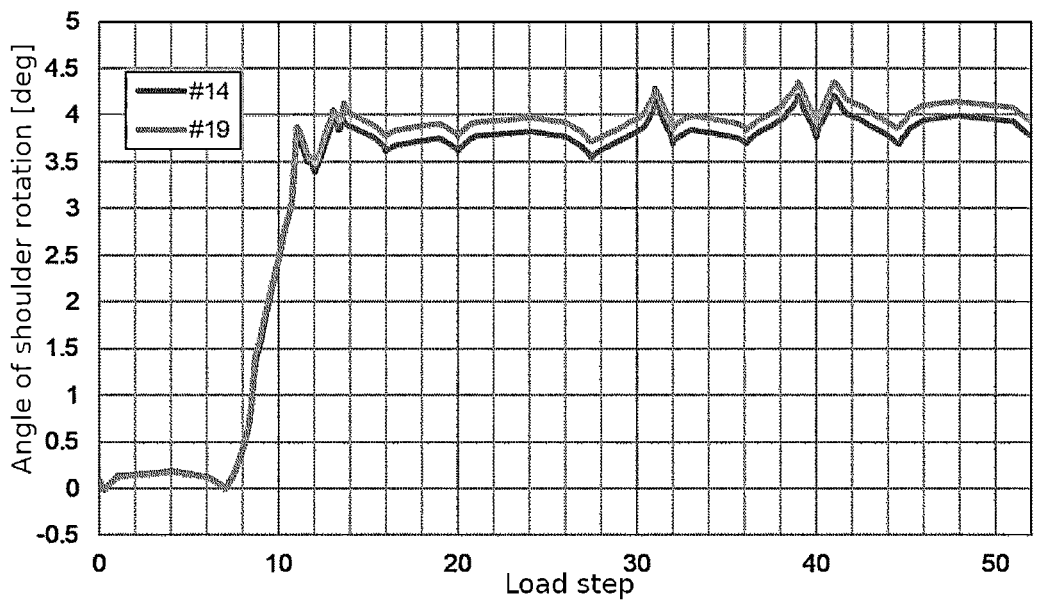
FIG. 18 is a graph showing the angle of shoulder rotation, for various load steps, in two test specimens #14 and #19 with different axial dimensions of the inner groove.
Figure 19:
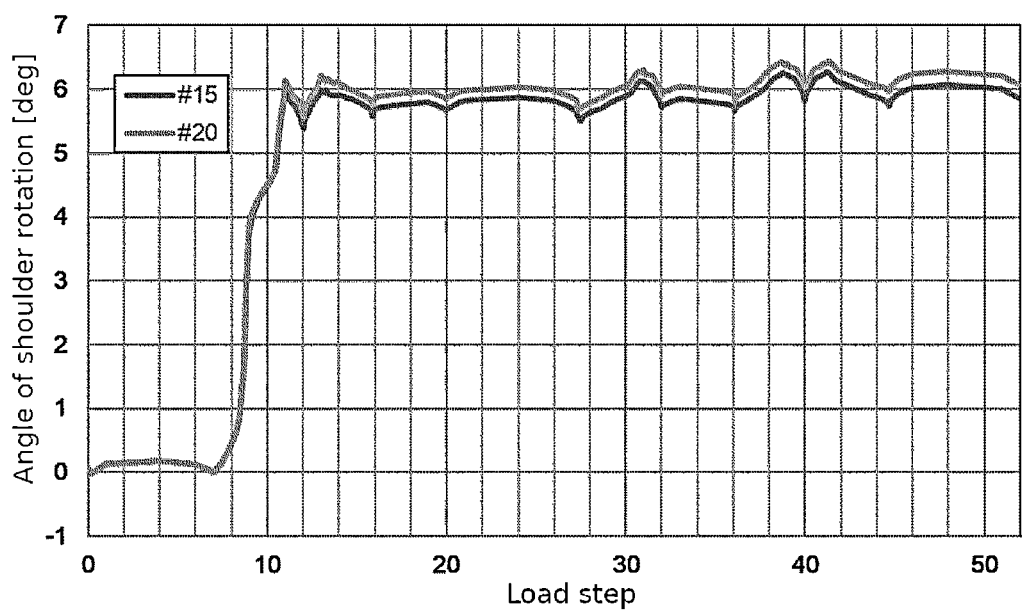
FIG. 19 is a graph showing the angle of shoulder rotation, for various load steps, in two test specimens #15 and #20 with different axial dimensions of the inner groove.

On the other hand, FIG. 13 enables recognizing a tendency that, for test specimens #4 and #9 with a stabbing clearance of 0.2 mm, the angle of shoulder rotation rose to about 3.0° at load step 11 and large damage was accumulated at the subsequent load steps. As shown in FIG. 14, for test specimens #5 and #10 with a stabbing clearance of 0.4 mm, the angle of shoulder rotation exceeded 4.0° at load step 11, and fluctuated at about 3.5° at the subsequent load steps.

Similar tendencies can be recognized from FIGS. 15 to 19 for test specimens #11 to #20 with different pipe diameters.

The results given above demonstrate that damage to the intermediate shoulder surfaces of a threaded connection for pipe with a two-step thread construction can be efficiently reduced if the stabbing clearance is 0.15 mm.

Further, it was found from FIGS. 10 to 19 that reducing the groove width of the inner groove 37 keeps the angle of rotation of the intermediate shoulder surfaces at a level that is lower, however slightly.

Thus, it was demonstrated that applying the present disclosure improves the compression resistance of a threaded connection for pipe with a two-step thread construction.

EXPLANATION OF CHARACTERS

1: threaded connection for pipe

2: pin; 23: male thread (outer thread portion); 27: male thread (inner thread portion); 25: intermediate shoulder surface

3: box; 32: female thread (outer thread portion); 36: female thread (inner thread portion); 34: intermediate shoulder surface

The invention claimed is:

1. A threaded connection for pipe, including a tubular pin and a tubular box, the pin and the box being adapted to be made up as the pin is screwed into the box, wherein the pin includes a male thread having an inner thread portion and an outer thread portion spaced apart from each other in an axial direction, and an intermediate shoulder surface provided between the inner thread portion and the outer thread portion of the male thread, the box includes a female thread having an inner thread portion adapted to be engaged by the inner thread portion of the male thread when the connection is made up and an outer thread portion adapted to be engaged by the outer thread portion of the male thread when the connection is made up, and an intermediate shoulder surface provided between the inner thread portion and the outer thread portion of the female thread and adapted to be in contact with the intermediate shoulder surface of the pin when the connection is made up, the male thread and the female thread are constructed in such a manner that, upon completion of make-up, load flanks of the male thread and the female thread are in contact with each other and a clearance is formed between stab flanks of the male thread and the female thread, the clearance formed between the stab flanks of the male thread and the female thread upon completion of make-up is of such a size that, when a predetermined axial compressive load smaller than a yield compressive load of the pin and the box is applied, the pin and the box deform in such a manner that the stab flanks of the male thread and the female thread start to be in contact so as to bear part of the axial compressive load, and the threaded connection for pipe satisfies the following expression:

$G \leq 0.12 + Dsh \times \tan 1°$, where G, in millimeters, is the dimension of the clearance formed between the stab flanks of the male thread and the female thread upon completion of make-up as measured in the pipe-axis direction, and Dsh, in millimeters, is the distance between a radially outer edge of the intermediate shoulder surface of the pin and a radially inner edge of the intermediate shoulder surface of the box as appearing in a longitudinal cross section upon completion of make-up, wherein $G \geq 0.07$ mm is satisfied, and wherein an axial distance between the location at which the contact between the stab flanks of the inner thread portions starts, due to the application of the predetermined axial compressive load, and the intermediate shoulder surfaces is 0.8 to 1.2 times an axial distance between the location at which the contact between the stab flanks of the outer thread portions starts due to the application of the predetermined axial compressive load and the intermediate shoulder surfaces.

2. The threaded connection for pipe according to claim 1, wherein $G \leq 0.15$ mm is satisfied.

3. The threaded connection for pipe according to claim 2, wherein:

the pin includes a sealing surface located further toward a pin end than the male thread is;

the box includes a sealing surface adapted to be in contact with the sealing surface of the pin when the connection is made up and an inner groove provided at a position on an inner periphery of the box between the sealing surface and the female thread of the box and extending circumferentially, the inner groove being adapted to accommodate part of the male thread of the pin when the connection is made up; and the inner groove has a groove bottom with an axial width smaller than twice a thread pitch of the male thread.

4. The threaded connection for pipe according to claim 3, wherein the intermediate shoulder surfaces of the pin and the box have a characteristic that an angle of shoulder rotation θ increases as the axial compressive load applied increases, and the angle of shoulder rotation θ at which the stab flanks of the male thread and the female thread start to be in contact to bear part of the axial compressive load is less than 1°, where the angle of shoulder rotation θ is the angle formed between a straight line passing through the radially outer edge of the intermediate shoulder surface of the pin and the radially inner edge of the intermediate shoulder surface of the box as appearing in a longitudinal cross section upon completion of make-up, and a straight line passing through the radially outer edge of the intermediate shoulder surface of the pin and the radially inner edge of the intermediate shoulder surface of the box as appearing in the same longitudinal cross section upon application of the axial compressive load.

5. The threaded connection for pipe according to claim 2, wherein the intermediate shoulder surfaces of the pin and the box have a characteristic that an angle of shoulder rotation θ increases as the axial compressive load applied increases, and the angle of shoulder rotation θ at which the stab flanks of the male thread and the female thread start to be in contact to bear part of the axial compressive load is less than 1°, where the angle of shoulder rotation θ is the angle formed between a straight line passing through the radially outer edge of the intermediate shoulder surface of the pin and the radially inner edge of the intermediate shoulder surface of the box as appearing in a longitudinal cross section upon completion of make-up, and a straight line passing through the radially outer edge of the intermediate shoulder surface of the pin and the radially inner edge of the intermediate shoulder surface of the box as appearing in the same longitudinal cross section upon application of the axial compressive load.

6. The threaded connection for pipe according to claim 1, wherein:
the pin includes a sealing surface located further toward a pin end than the male thread is;
the box includes a sealing surface adapted to be in contact with the sealing surface of the pin when the connection is made up and an inner groove provided at a position on an inner periphery of the box between the sealing surface and the female thread of the box and extending circumferentially, the inner groove being adapted to accommodate part of the male thread of the pin when the connection is made up; and
the inner groove has a groove bottom with an axial width smaller than twice a thread pitch of the male thread.

7. The threaded connection for pipe according to claim 6, wherein the intermediate shoulder surfaces of the pin and the box have a characteristic that an angle of shoulder rotation θ increases as the axial compressive load applied increases, and the angle of shoulder rotation θ at which the stab flanks of the male thread and the female thread start to be in contact to bear part of the axial compressive load is less than 1°,
where the angle of shoulder rotation θ is the angle formed between a straight line passing through the radially outer edge of the intermediate shoulder surface of the pin and the radially inner edge of the intermediate shoulder surface of the box as appearing in a longitudinal cross section upon completion of make-up, and a straight line passing through the radially outer edge of the intermediate shoulder surface of the pin and the radially inner edge of the intermediate shoulder surface of the box as appearing in the same longitudinal cross section upon application of the axial compressive load.

8. The threaded connection for pipe according to claim 1, wherein the intermediate shoulder surfaces of the pin and the box have a characteristic that an angle of shoulder rotation θ increases as the axial compressive load applied increases, and the angle of shoulder rotation θ at which the stab flanks of the male thread and the female thread start to be in contact to bear part of the axial compressive load is less than 1°,
where the angle of shoulder rotation θ is the angle formed between a straight line passing through the radially outer edge of the intermediate shoulder surface of the pin and the radially inner edge of the intermediate shoulder surface of the box as appearing in a longitudinal cross section upon completion of make-up, and a straight line passing through the radially outer edge of the intermediate shoulder surface of the pin and the radially inner edge of the intermediate shoulder surface of the box as appearing in the same longitudinal cross section upon application of the axial compressive load.

* * * * *